Oct. 15, 1957 — E. HAJOS — 2,809,781
SPARK FOLLOW-UP AND REMOTE CONTROL FOR COMBINATION WEIGHING SCALES
Filed April 2, 1949 — 5 Sheets-Sheet 1

INVENTOR.
EUGENE HAJOS
Frederick Grusoria
ATTORNEY

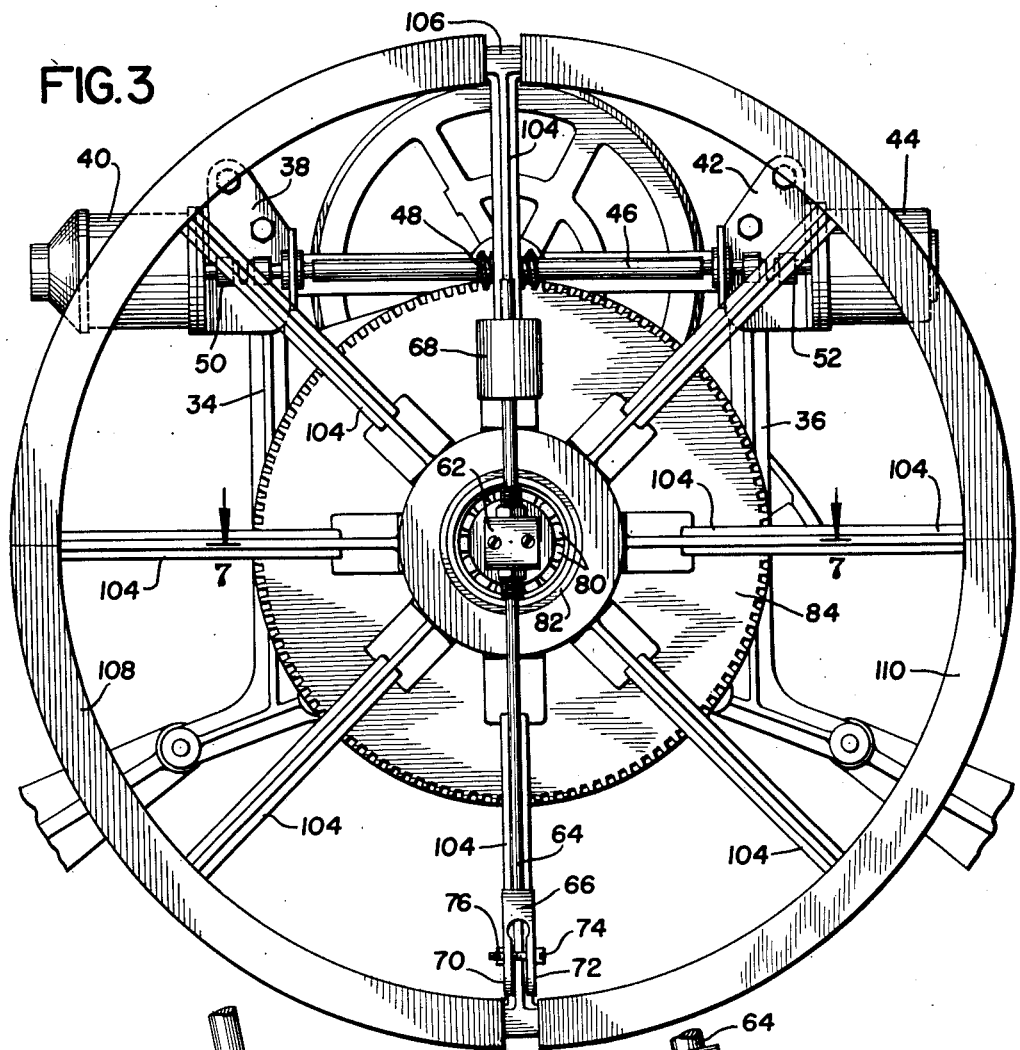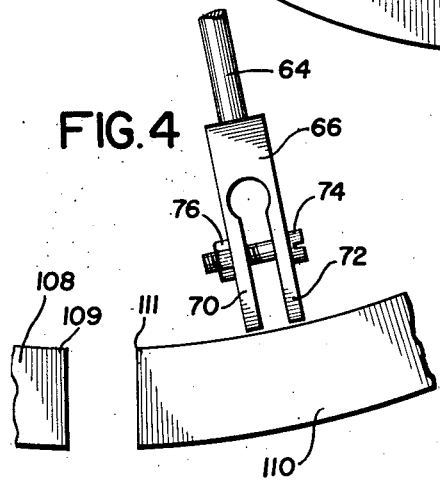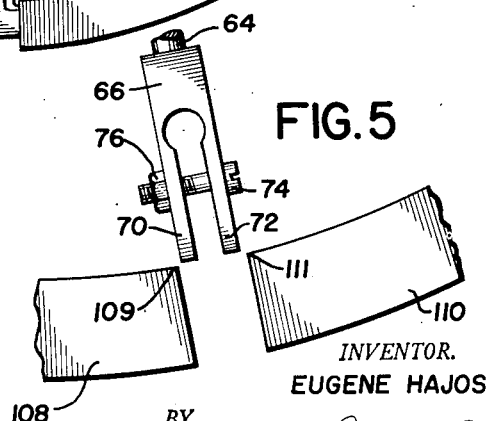

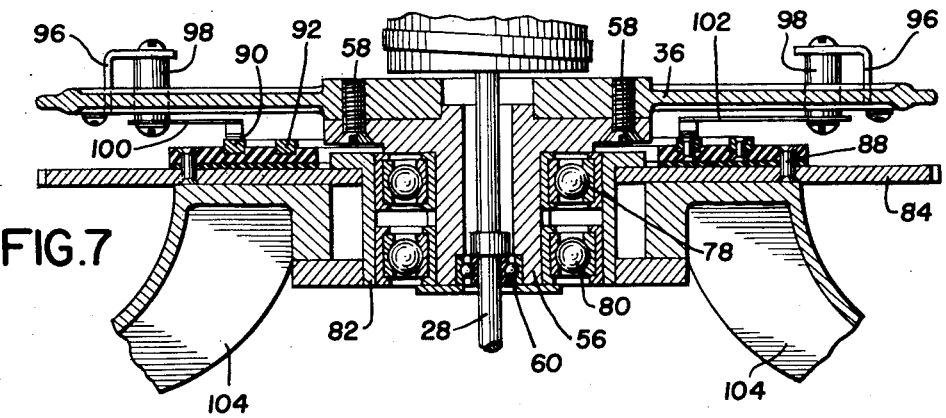
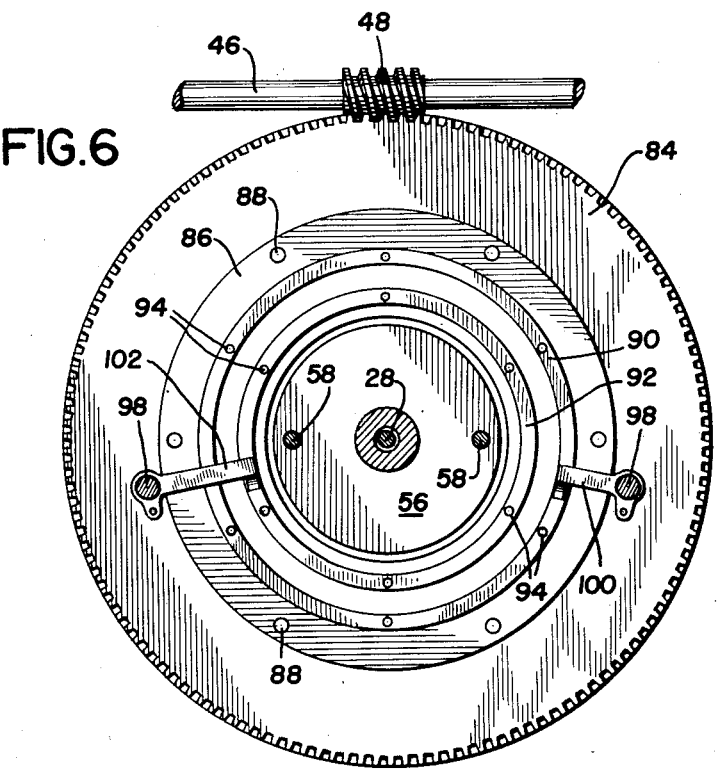

Oct. 15, 1957 E. HAJOS 2,809,781
SPARK FOLLOW-UP AND REMOTE CONTROL FOR
COMBINATION WEIGHING SCALES
Filed April 2, 1949 5 Sheets-Sheet 5
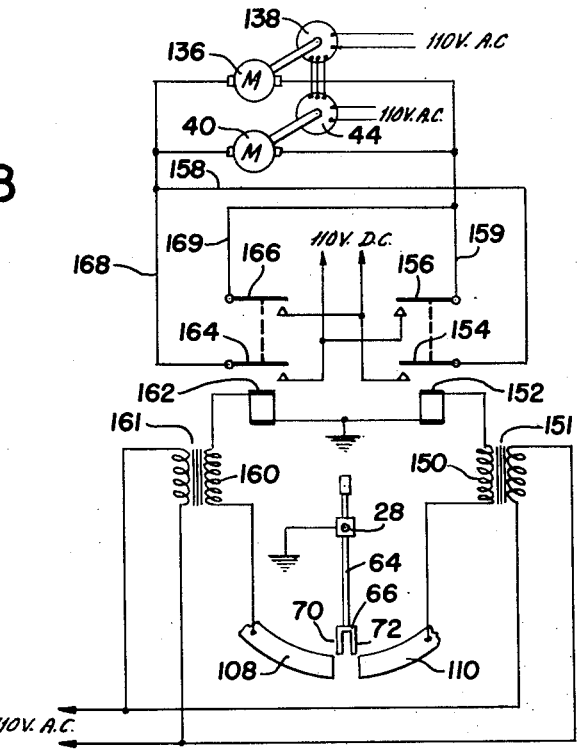
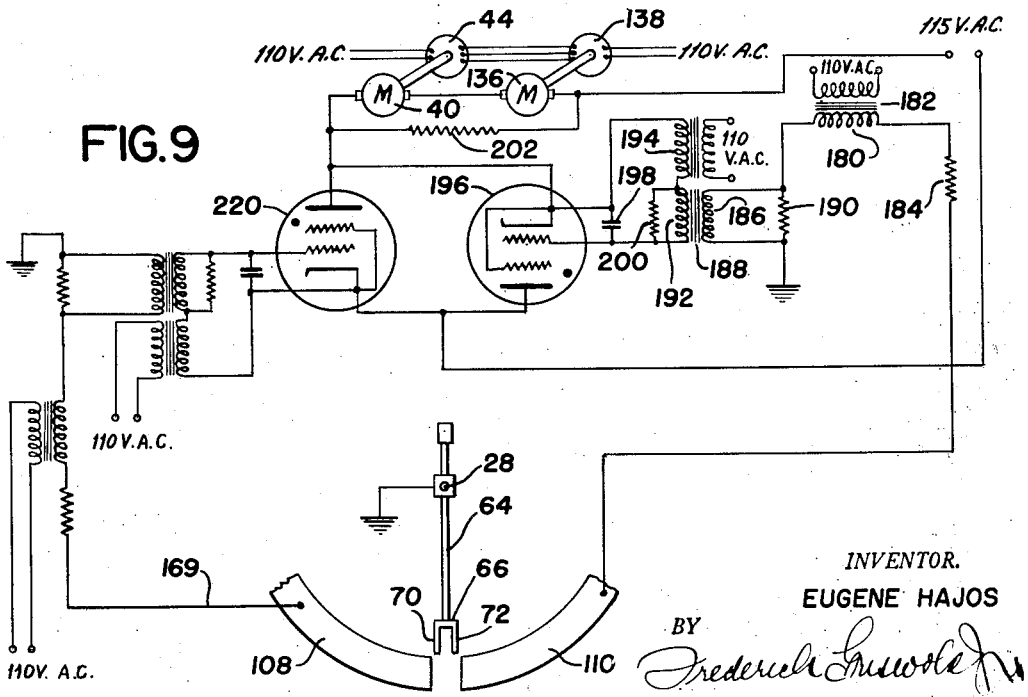
INVENTOR.
EUGENE HAJOS
BY
Frederick Griswold
ATTORNEY.

United States Patent Office 2,809,781
Patented Oct. 15, 1957

2,809,781

SPARK FOLLOW-UP AND REMOTE CONTROL FOR COMBINATION WEIGHING SCALES

Eugene Hajos, Rutland, Vt., assignor, by mesne assignments, to The Howe Scale Company, Rutland, Vt., a corporation of Delaware Application April 2, 1949, Serial No. 85,218

7 Claims. (Cl. 235—27)

This invention relates to combination weighing scales.

More particularly the invention relates to novel means for controlling the operation of auxiliary mechanism associated with the scale.

One object of this invention is a novel instrumentality for controlling auxiliary mechanisms for a scale such as a weight indicating mechanism having no direct connection with the weighing mechanism.

Another object of the present invention is a follow up mechanism having no direct mechanical connection with weighing mechanism such as would impose a load or drag on such mechanism and thereby eliminating any possibility of objectionable interference with the functioning of the weighing mechanism.

It is also an object of the invention to provide a weighing scale with a part movable to various load points for controlling a motor driven mechanism to move in either direction to follow the scale part to the load point and another motor driven mechanism remote from the scale operated simultaneously with the first to record the scale reading on auxiliary equipment.

Yet another object of the invention is to provide a spark gap to control the aforesaid motors.

A further object of the invention is to provide means to move a follow up device with relation to an indicator with a minimum of lag and with any tendency toward hunting reduced to a minimum.

These and other objects of the invention and the means for their attainment will be more apparent from the following detailed description, taken in connection with the accompanying drawings illustrating various embodiments by which the invention may be realized, and in which:

Figure 3 is a view in rear elevation taken in the plane indicated by the line 3—3 of Figure 2 and looking in the direction of the arrows.

Figure 4 is an enlarged fragmentary view showing the spark gap electrode in rotated position.

Figure 5 is a view similar to Figure 4 but showing the follow up sectors rotated to a position in alignment with the spark gap electrode.

Figure 6 is a view taken in the plane indicated by the line 6—6 of Figure 2 and looking in the direction of the arrows, and showing the collector ring disc and the driving gears.

Figure 7 is an enlarged transverse sectional view taken in the plane indicated by the line 7—7 of Figure 2 and showing the arrangement of the brushes.

Figure 8 is a schematic circuit diagram of one form of the invention.

Figure 9 is a schematic circuit diagram showing a preferred disposition of the invention.

Figure 1:
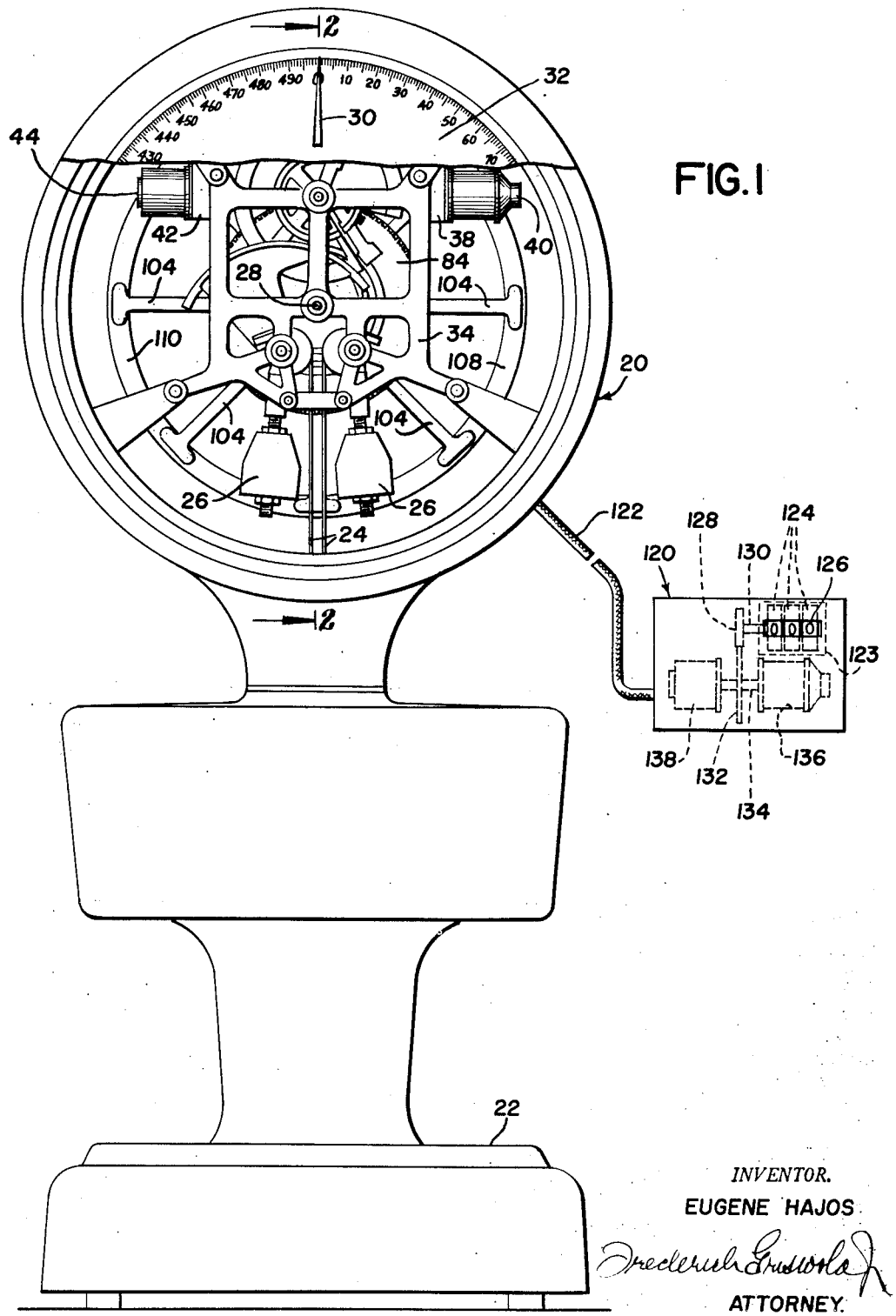
Figure 1 is a view in front elevation showing a scale connected by the novel follow up means of this invention to an auxiliary indicator, the chart being partly broken away to show details of construction.

Referring now to the drawings in detail and wherein like parts are designated by like reference characters, the scale 20 shown in Figure 1 is provided with a platform 22 which, by suitable linkage (not shown), is operated in the usual manner and pulls down on the tapes 24 to elevate the pendulums 26 and rotate the indicator shaft 28. The indicator shaft carries the pointer 30 which assumes a position corresponding to the load on the platform and indicates the load on the dial chart 32.

The pendulums 26 and indicating instrumentalities are mounted on a pair of supported spaced frames, that is front frame 34 and rear frame 36. A bracket 38 supporting a permanent magnet or separately excited motor 40 is fixed to an upper corner of the rear frame 36 as is best shown in Figure 3. A similar bracket 42 carrying a Selsyn motor 44 is secured to the opposite upper corner of frame 36. Brackets 38 and 42 are provided with suitable bearings to rotatably support a shaft 46 which carries at its center a worm 48. At one of its ends shaft 46 is connected for rotation to motor 40 by a coupling 50 and at its other end to Selsyn motor 44 by a coupling 52.

Figure 2:
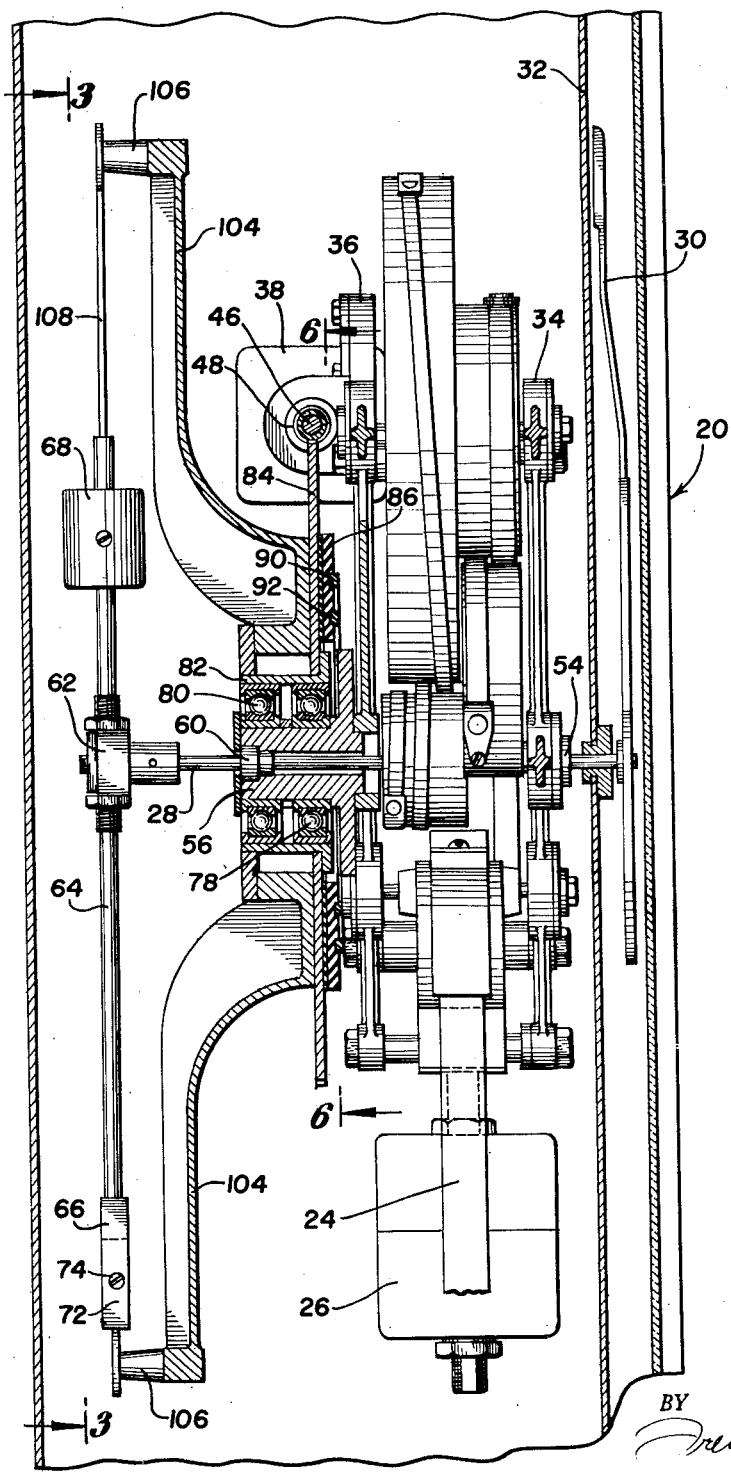
Figure 2 is a transverse sectional view taken in the plane indicated by the line 2—2 of Figure 1, and looking in the direction of the arrows.

Referring now to Figures 2 and 7, it will be observed that frame 34 is provided with a bearing 54 to support the forward end of the indicator shaft 28. A flanged member 56 is fixed to frame 36 by screws 58 and carries at its outer end a bearing 60 to support the rearward end of the indicator shaft 28.

As shown in Figures 2 and 3, a fitting 62 is pinned to the rearward end of the indicator shaft 28 to adjustably carry a radial rod 64. Rod 64 has fixed to its lower end a bifurcated spark electrode 66 and carries at its upper end a counterweight 68. The spark electrode 66 has a pair of legs 70 and 72, and a screw 74 having a locknut 76 which is provided to adjust the distance across the lower outside extremities of the legs.

A pair of ball bearings 78 and 80 are mounted on the outer periphery of the flanged member 56 as shown in Figures 2, 3 and 7. Mounted on the outer races of the ball bearings is a flanged sleeve 82 which carries a worm gear 84 adapted to mesh with the worm 48 previously described. An annular disc 86 of insulating material is mounted by means of rivets 88 to the worm gear 84, and collector rings 90 and 92 are attached by rivets 94 to the disc 86 (Figure 6).

Mounted on the rear frame 36 are a pair of brackets 96 each provided with insulating spacers 98 to support contact wipers 100 and 102 arranged to make electrical contact with collector rings 90 and 92 respectively (Figure 7).

As shown in Figures 2 and 3, radial arms 104 are rigidly mounted on the sleeve 82 and worm gear 84. At their outer ends the arms carry insulating spacers 106 to which are mounted a pair of substantially semi-circular reversing sectors 108 and 110, spaced apart at their ends an appropriate distance with respect to the span of the legs 70 and 72 of the electrode 66. Sectors 108 and 110 are electrically connected to collector rings 90 and 92 respectively by suitable wiring (not shown).

Radial rod 64 is normally adjusted so that the lower tips of electrode 66 may swing around closely to and within the inner surfaces of sectors 108 and 110 to provide an appropriate spark gap. When the pointer 30 of the scale is at zero position the span of the legs 70 and 72 of the electrode is adjusted so that the gaps between the legs and the inner corners 109 and 111 of the sectors are just too great to form a spark, thus resulting in an open circuit.

An auxiliary weight indicator 120 is shown in Figure 1 as being connected to the scale 20 by an electrical cable 122. The weight indicator in this instance is represented as being in the form of a counter 123 having digit indicating wheels 124 visible through a window 126. A gear 128 on the counter shaft 130 is engaged by a gear 132 on a motor shaft 134 rotated by a permanent magnet or separately excited motor 136. A Selsyn motor 138 is coupled to the opposite end of the shaft 134. It will be readily understood that in the weight indicator 129 any convenient form of indicating or printing device, suitably driven from the motor shaft 134, may be substituted for the counter 123 illustrated in the drawing.

The operation of the apparatus will now be described with particular reference to Figure 8.

Assuming that a load has been applied to the scale platform 22 and indicator shaft 28 has been rotated a corresponding amount, the pointer 30 now indicates on the chart 32 the weight of the applied load. As shaft 28 rotates it carries electrode 66 around inside sector 110 forming a spark between the parts as illustrated for example in Figure 4. Thus a circuit has been established from the secondary winding 150 of a transformer 151 through the sector 110, across the spark gap to the electrode 66 and through ground connections to relay coil 152 and back to the opposite side of the secondary winding 150. Energization of relay 152 closes the normally open contacts 154 and 156 closing a circuit from one side of a 110 volt D. C. line through contact 154 and wire 158, through armatures of motors 40 and 136 and by wire 159 through contact 156 to the other side of the D. C. line. Motors 40 and 136 being connected in parallel will operate in approximate synchronism. Motors 40 and 136 are coupled to Selsyn motors 44 and 138 respectively, which maintain absolute synchronism. The fields of each Selsyn motor is connected to a 110 volt A. C. line.

From the above it will be seen that the motor 40, through gears 48 and 84, will drive the sectors 108 and 110 around in a counter clockwise direction as viewed in Figure 3. Simultaneously, motor 136 through gears 128 and 132 will be driving the counter 123. When the sectors have revolved to the point where the space between them is opposite the electrode 66, as shown in Figure 5, the gap between the legs 70, 72 and the sector corners 109 and 111 will be too wide for the spark to jump and the circuit previously described will be broken thereby deenergizing relay coil 152 and stopping the motors 40 and 136. At this time the counter digit wheels 124 will show a reading corresponding to the position of pointer 30 on the chart 32.

When the load on the scale platform 22 is removed, indicator shaft 28 rotates, returning pointer 30 and electrode 66 to zero position. A spark now jumps between electrode 66 and sector 108 completing a circuit from the secondary winding 160 of a transformer 161, through sector 108, through electrode 66, through ground connections to relay coil and to the opposite side of the secondary winding 160. Energization of relay coil 162 closes the normally open contacts 164 and 166 thereby closing a circuit from one side of the 110 volt D. C. line through the contact 164 and wire 168, through motors 40 and 136, and then by wire 160 through contact 166 to the other side of the D. C. line.

It will be seen that now the motors 40 and 136 are energized to rotate in an opposite direction from the previous operation and the sectors 108 and 110 and also the counter digit wheels 124 are brought back to their normal zero position. When the zero position is reached the spark between the sector 108 and electrode 66 is broken thereby deenergizing relay coil 162 and breaking the circuit to motors 40 and 136, and the mechanism comes to rest.

From the simplified circuit shown in Figure 8 it will be apparent that as the space between the sectors 108 and 110 comes into alignment with electrode 66, there may be a tendency for the sectors to override, in which case a spark will pass between the opposite sector and the electrode, making a new circuit and reversing the motors to bring the space back to its alignment with the electrode. To eliminate this tendency toward hunting it is preferred to employ a circuit in which thyratron tubes are utilized in place of the relays previously described in order to obtain instantaneous reversal of current controlling the motors 40 and 136.

Referring now to Figure 9, operation of this invention incorporating thyratron tubes will be described.

When a load is applied to the scale and indicator shaft 28 rotates counter clockwise, as viewed in Figure 9, a spark jumps between electrode 66 and sector 110. The circuit is thus established from one side of a secondary winding 180 of a high voltage transformer 182, through current reducing resistor 184, through sector 110, across the spark to electrode 66, through ground connections, through the grid resistor 190 and back to the other end of winding 180.

The A. C. potential appearing across resistor 190 is transformed by potential transformer 188 to a value suitable for application to the grid of thyratron 196. This potential, appearing across resistor 200 is greater in magnitude and opposite in direction to the opposing bias being continuously supplied by biasing transformer 194, and causes the thyratron 196 to fire. A capacitor 198 prevents spurious firing. The firing of the thyratron tube results in the operation of motors 40 and 136 by a current flowing from one side of a 115 volt A. C. line through the motors connected in series, through thyratron cathode, across to the anode and back to the opposite side of the A. C. line. A resistor 202 is connected in parallel with the motors to cause dynamic braking.

When the sector gap reaches a point in alignment with electrode 66 the spark between sector 110 and the electrode is broken and the motors are instantly stopped.

When the load on the scale is removed and indicator shaft 28 rotates toward zero a spark is established between electrode 66 and sector 108, which through electrical elements similar to those described above, sets up a circuit through a thyratron tube 220, closing the circuit to motors 40 and 136 which now operate in a reverse direction to rotate the sectors and counter digit wheels to zero position.

From the above it will be seen that because of the rapid action of the circuits set up through the respective thyratron tubes 196 and 220, motors 40 and 136 may be instantaneously started, stopped or reversed so that any tendency toward hunting when the sector gap moves into alignment with the electrode is brought to a minimum.

Various modifications will occur to those skilled in the art in the disposition and construction of the component elements going to make up the invention as a whole and no limitation is intended by the phraseology of the foregoing description or illustrations in the accompanying drawings except as indicated in the appended clams.

What is claimed is:

1. A weighing scale comprising a member movable in response to weight, a remote weight indicator, means including a reversible electric motor for actuating said indicator, an electric circuit for said motor including a source of voltage, an electrode movable with said movable member, a pair of electrodes spaced apart to form an insulating section, said first electrode being normally adapted to cooperate with said insulating section out of circuit establishing relation with said pair of electrodes, said first electrodes being adapted to move into circuit establishing relation with one of said pair of electrodes when said movable member moves in response to weight, said pair of electrodes being spaced from said first electrode to form an air gap, the voltage of said circuit being sufficient to cause a spark to jump the gap when said first electrode is in circuit establishing relation with one of said pair of electrodes to close a circuit through the motor in one direction, said device being characterized by said first electrode having a bifurcated end adapted to cooperate with said insulating section and said pair of electrodes, and means for varying the distance between said bifurcations to vary the amount of movement necessary to bring the first electrode into circuit establishing relation with one or the other electrode of said pair of electrodes.

2. A weighing scale of the type having an indicator shaft, a platform operated by the weight to be measured and a transmission to transmit the movement of said platform to the shaft; the combination therewith of an arrangement to indicate or record the weight to be measured comprising a radial member movable in response to weight, a remote weight indicator, means including an electric motor for actuating said remote weight indicator, an electric circuit for said motor, a second motor in said circuit connected in parallel with said first motor, an electrode at the end of said radial member and movable with said movable member, a second rotatable semicircular arcuate electrode normally out of circuit establishing relation with said first electrode, said first electrode being adapted to move into circuit establishing relation with said second electrode when said movable member moves in response to weight, the movement of said electrodes into circuit establishing relation closing the circuit through said motors, a Selsyn motor operatively connected to each of said motors, and electric connections between the Selsyn motors for locking said Selsyn motors and said first-named motors in predetermined relationship.

3. A follow-up mechanism for mounting upon the back of a scale dial having an indicator pointer and a pointer shaft, said mechanism having a rotatably mounted diametrically extending rod carrying at its outside end a bifurcated spark electrode and a rotatably mounted pair of semi-circular reversing sectors extending circularly for substantially the entire 360° in a circle just outside of and slightly spaced away from the spark electrode, said electrode and pair of sectors being mounted centrally to turn around the same axis as said pointer shaft, said pair of sectors being provided with a ball-bearing mount encircling said pointer shaft and being provided with a worm and gear drive having an electric motor drive actuated by the current set up by the spark jumping from said spark electrode to one of said sectors.

4. A dial head construction for a dial scale having a visual indicator dial and pointer on the front thereof for visual indication and an electrical indicator on the rear thereof having a rotatable diametral rod carrying at one end thereof a forked electrode and a rotatable circular electrode encircling and slightly spaced from and outside of the path of travel of said forked electrode, said circular electrode having gaps 180° apart and splitting the circular electrode into two arcuate substantially 180° halves which are insulated from each other, a common shaft extending through said dial carrying said pointer and said diametral rod with said forked electrode so that they will turn together and in unison, a ball bearing arrangement for said circular electrode encircling said shaft provided with a gear and worm drive, an electric motor for driving said gear and worm drive, a high voltage electric source for driving said motor provided with a circuit connected at one side to said electrode and at the other side to said circular electrode, said ball bearing, gear and worm drive and electric motor being positioned between said visual indicator dial and said electrical indicator, the voltage source being sufficiently high to establish a spark across the spacing between the forked electrode and the circular electrode and a closed circuit when the forked electrode is spaced away from one of the gaps and thus establish a circuit to drive said motor and being insufficient to thus establish said circuit when said forked electrode is centrally positioned in one of said gaps as a result of relative movement between the forked electrode and the circular electrode, so that the forked electrode and dial pointer will move together upon visual indication of a weight upon the scale and the circular electrode will then be driven by said motor until one of said gaps comes opposite the forked electrode.

5. The construction of claim 4, said rod and said circular electrode being positioned and rotating in the same plane transverse to the common shaft and said circular electrode consisting of a thin plate while said forked electrode consists of a relatively thick member projecting on each side of the plate.

6. The dial head construction of claim 4, said diametral rod having an adjustable weight positioned on the opposite side of the shaft from the forked electrode.

7. A dial head construction for a dial scale having a visual indicator dial and pointer on the front thereof for visual indication and an electrical indicator on the rear thereof having a rotatable diametral rod carrying at one end thereof a forked electrode and a rotatable circular electrode encircling and slightly spaced from and outside of the path of travel of said formed electrode, said circular electrode having gaps 180° apart and splitting the circular electrode into two arcuate substantially 180° halves which are insulated from each other, a common shaft extending through said dial carrying said pointer and said diametral rod with said forked electrode so that they will turn together and in unison, a ball bearing arrangement for said circular electrode encircling said shaft provided with a gear and worm drive, an electric motor for driving said gear and worm drive, a high voltage electric source for driving said motor provided with a circuit connected at one side to said electrode and at the other side to said circular electrode, said ball bearing, gear and worm drive and electric motor being positioned between said visual indicator dial and said electrical indicator, the voltage source being sufficiently high to establish a spark across the spacing between the forked electrode and the circular electrode and a closed circuit when the forked electrode is spaced away from one of the gaps and thus establish a circuit to drive said motor and being insufficient to thus establish said circuit when said forked electrode is centrally positioned in one of said gaps as a result of relative movement between the forked electrode and the circular electrode, so that the forked electrode and dial pointer will move together upon visual indication of a weight upon the scale and the circular electrode will then be driven by said motor until one of said gaps comes opposite the forked electrode, said forked electrode being of U-shape and having two resilient legs, said resilient legs being provided with an adjustment to adjust the spacing between the legs.

References Cited in the file of this patent

UNITED STATES PATENTS

| | | |
|---|---|---|
| 1,293,296 | Andersen | Feb. 4, 1919 |
| 2,032,016 | Hitner | Feb. 25, 1936 |
| 2,046,005 | Sprecker | June 30, 1936 |
| 2,089,914 | Freeman | Aug. 10, 1937 |
| 2,113,197 | Lang | Apr. 5, 1938 |
| 2,315,176 | Zacharia | Mar. 30, 1943 |
| 2,346,117 | Stabler | Apr. 4, 1944 |
| 2,484,573 | Kezer | Oct. 11, 1949 |
| 2,496,485 | McNaney | Feb. 7, 1950 |
| 2,594,436 | Hornfeck | Apr. 29, 1952 |

FOREIGN PATENTS

| | | |
|---|---|---|
| 552,968 | France | May 11, 1923 |
| 8,112 | Great Britain | 1902 |